US009170839B2

(12) United States Patent
Guevorkian et al.

(10) Patent No.: US 9,170,839 B2
(45) Date of Patent: Oct. 27, 2015

(54) METHOD FOR JOB SCHEDULING WITH PREDICTION OF UPCOMING JOB COMBINATIONS

(75) Inventors: David Guevorkian, Tampere (FI); Jan Westmeijer, Dorsten (DE)

(73) Assignee: Nokia Technologies Oy, Espoo (FI)

( * ) Notice: Subject to any disclaimer, the term of this patent is extended or adjusted under 35 U.S.C. 154(b) by 1530 days.

(21) Appl. No.: 12/125,568

(22) Filed: May 22, 2008

(65) Prior Publication Data

US 2009/0293060 A1    Nov. 26, 2009

(51) Int. Cl.
*G06F 9/46* (2006.01)
*G06F 9/48* (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS

| | | | | |
|---|---|---|---|---|
| 5,729,790 A * | 3/1998 | Conley et al. | ................... | 399/77 |
| 7,075,412 B1 * | 7/2006 | Reynolds et al. | ........... | 340/10.2 |
| 7,428,452 B2 * | 9/2008 | Howlett et al. | ................. | 701/19 |
| 7,675,852 B1 * | 3/2010 | Arundale et al. | ............. | 370/229 |
| 7,734,493 B1 * | 6/2010 | Anbil | ......................... | 705/7.22 |
| 7,784,028 B2 * | 8/2010 | Luo et al. | ...................... | 717/120 |
| 2005/0015768 A1 * | 1/2005 | Moore | ......................... | 718/102 |
| 2005/0027579 A1 * | 2/2005 | Tiourine et al. | ................... | 705/8 |
| 2005/0223191 A1 * | 10/2005 | Ferris | ............................ | 712/28 |
| 2006/0200333 A1 * | 9/2006 | Dalal et al. | ..................... | 703/17 |
| 2007/0198839 A1 * | 8/2007 | Carle et al. | ..................... | 713/176 |
| 2008/0222640 A1 * | 9/2008 | Daly et al. | .................... | 718/103 |
| 2009/0178044 A1 * | 7/2009 | Musuvathi et al. | ........... | 718/102 |

* cited by examiner

*Primary Examiner* — Abdullah Al Kawsar
(74) *Attorney, Agent, or Firm* — Locke Lord LLP

(57) ABSTRACT

A method for scheduling different combinations of jobs simultaneously running on a shared hardware platform is disclosed. Schedules may be created while executing the current set of jobs, for one or more possible sets of jobs that may occur after a change in the current set of jobs. In at least one embodiment, the present invention may be implemented in a SDR system where the jobs may correspond to radios in the SDR system. The possible combinations of radios that may occur after a change in the set of currently running radios may be determined at run time by adding or removing one radio at a time from the set of currently running radios.

10 Claims, 2 Drawing Sheets

METHOD FOR JOB SCHEDULING WITH PREDICTION OF UPCOMING JOB COMBINATIONS

BACKGROUND

1. Field of Invention

Various embodiments of the present invention relate to job scheduling, and more specifically, to a method for scheduling different combinations of jobs simultaneously running on a shared hardware platform.

2. Background

In a real-time computing platform running several jobs, each having their own time constraints, a scheduler may be used to define the processing units where each job is to be implemented. The scheduler may also be used to determine the time sequence according to which the jobs are to be implemented. Efficiency and even applicability of different scheduling policies depend on the requirements of the set of jobs that are being implemented by the platform.

A job may consist of several tasks. Likewise, a scheduler may be used to define the processing units where each task of one or more jobs is to be implemented. The scheduler may also be used to determine the time sequence according to which the tasks of one or more jobs are to be implemented.

Allocating jobs or tasks to processors, determining the order of execution of jobs or tasks on each processor and determining the execution times of each job or task may be performed either at run-time (a dynamic strategy) or at compile time (static strategy). Thus, the scheduling policy implements not only the rule according to which jobs or tasks are ordered, executed or assigned to processors, but also the relative time (either run-time or compile time) when these steps are performed.

Currently, there does not exist a scheduling policy that is devoted to applications where each job or task itself is a stationary one but the combinations of jobs are dynamically changed in time. In such piece-wise stationary applications several stationary jobs or tasks may be initiated or terminated at arbitrary time instances. A typical piece wise stationary application is the Software Defined Radio (SDR) system where each radio standard, in a fixed mode, is a stationary job with a fixed sequence of tasks having predictable worst-case execution times but every radio may turn On/Off, or change its mode at an arbitrary time instance.

SDR systems set very high requirements for the scheduler due to absolute real-time constraints of individual radios and unpredictable behavior of the system due to random change in the set of radios currently running on the system. Utilizing conventional dynamic schedulers is not feasible because they jeopardize the real-time constraints of radios and static schedulers cannot handle the dynamic (unpredictable) changing of radios.

SUMMARY

Exemplary embodiments of the present invention may include at least a method, apparatus, computer program and chipset for creating schedules, while executing the current job combination, for all possible job combinations that may occur after the current job combination. In at least one embodiment, the present invention may be implemented in a SDR system where the jobs may correspond to radios in the SDR system. The possible combinations of radios that may occur after a change in the set of currently running radios may be obtained at run time by adding or removing one radio at a time from the set of currently running radios.

According to an exemplary embodiment of the present invention, there is provided a method, comprising receiving a request to execute a current set of jobs, the current set of jobs including one or more jobs to be executed by a processing apparatus, retrieving a predetermined schedule corresponding to the current set of jobs, executing the current set of jobs according to the predetermined schedule, determining, at the time of execution, at least one set of jobs that may occur after a change in the current set of jobs, and creating schedules for said at least one set of jobs that may occur after the change in the current set of jobs.

According to another exemplary embodiment of the present invention, there is provided an apparatus, comprising a plurality of radios, a processing apparatus, said processing apparatus configured to receive a request to execute a current set of jobs, the current set of jobs including one or more jobs to be executed by the processing apparatus, retrieve a predetermined schedule corresponding to the current set of jobs, execute the current set of jobs according to the predetermined schedule, determine, at the time of execution, at least one set of jobs that may occur after a change in the current set of jobs, and create schedules for said at least one set of jobs that may occur after the change in the current set of jobs.

According to yet another exemplary embodiment of the present invention, there is provided a computer program product comprising a computer readable medium having computer readable program code embodied in said medium, comprising a computer readable program code configured to receive a request to execute a current set of jobs, the current set of jobs including one or more jobs to be executed by a processing apparatus, a computer readable program code configured to retrieve a predetermined schedule corresponding to the current set of jobs, a computer readable program code configured to execute the current set of jobs according to the predetermined schedule, a computer readable program code configured to determine, at the time of execution, at least one set of jobs that may occur after a change in the current set of jobs, and a computer readable program code configured to create schedules for said at least one set of jobs that may occur after the change in the current set of jobs.

According to yet another exemplary embodiment of the present invention, there is provided a chipset, comprising at least one controller module, the controller module configured to receive a request to execute a current set of jobs, the current set of jobs including one or more jobs to be executed by a processing apparatus, retrieve a predetermined schedule corresponding to the current set of jobs, execute the current set of jobs according to the predetermined schedule, determine, at the time of execution, at least one set of jobs that may occur after a change in the current set of jobs, and create schedules for said at least one set of jobs that may occur after the change in the current set of jobs.

DESCRIPTION OF DRAWINGS

The invention will be further understood from the following detailed description of one or more embodiments, taken in conjunction with appended drawings, in which.

DESCRIPTION OF EXEMPLARY EMBODIMENTS

While the invention has been described in one or more embodiments, various changes can be made therein without departing from the spirit and scope of the invention, as described in the appended claims.

Figure 1:
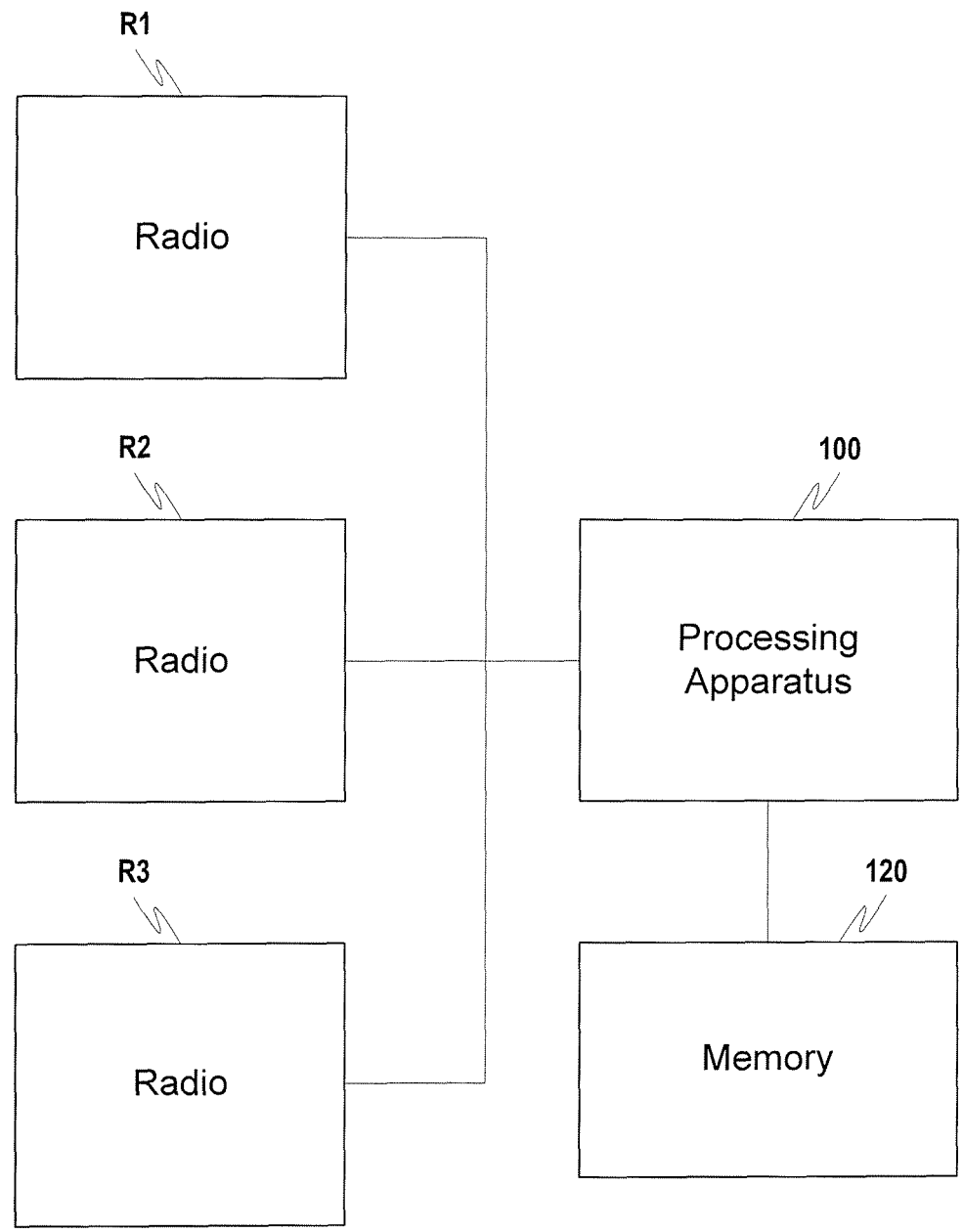
FIG. 1 discloses a block diagram of an exemplary computing system usable with at least one embodiment of the present invention.

FIG. 1 discloses an exemplary structural layout of a computing system usable with at least one embodiment of the present invention. In the example shown in FIG. 1, processing apparatus 100, which may control overall operation of the system, and may be coupled to memory 120 and radios R1-R3. Processing apparatus 100 may be implemented with one or more microprocessors and/or hardware accelerators (not shown) that are each capable of executing software instructions stored in memory 120.

Memory 120 may include random access memory (RAM), read only memory (ROM), and/or flash memory, and store information in the form of data and software components (also referred to herein as modules). The data stored by memory 120 may be associated with particular software components. The software components stored by memory 120 may include instructions that may be executed by processing apparatus 100. Various types of software components may be stored in memory 120. For instance, memory 120 may store an operating system and application programs.

The elements shown in FIG. 1 may be constituted and coupled according to various techniques. One such technique involves coupling separate hardware components corresponding to processing apparatus 100, memory 120 and radios R1-R3 through one or more bus interfaces (which may be wired or wireless bus interfaces). Additionally, radios R1-R3 may be implemented as part of a software defined radio (SDR) system. Alternatively, any or all of the individual components, or additional components, may be replaced by an integrated circuit in the form of a programmable logic device, gate array, ASIC, multi-chip module, etc. programmed to replicate the functions of the stand-alone devices. In addition, each of these components may be coupled to a power source, such as a removable and/or rechargeable battery (not shown).

It is important to note that the scope of the functionality of the exemplary computing system utilized in accordance with at least one embodiment of the present invention need not have all of, or could indeed add additional features to, the previously discussed components and interfaces. The computing system previously described is but one example of a usable device.

As previously mentioned, conventional fully dynamic or fully static scheduling methods are not suitable for software defined radio (SDR) systems. In a quasi-static approach, schedules are created at re-configuration time. In this approach, processor assignment and the execution order of jobs are determined at compile time. Job execution times are determined after an external request for a change in the set of currently running radios (either a new radio is requested to run or one of the running radios is requested to terminate) is received. However, this approach requires a high overhead and does not provide sufficient time for optimizing the schedules due to the real-time constraints of a SDR system.

Another approach for scheduling a SDR system supporting a small number of radios would be to create schedules for all possible situations at compile time. However, this approach is not efficient since a schedule for a radio combination would have to take into account the previous state of the system (the schedule for the previous radio combination) in order to not interrupt the radio implementations from the previous combination. Thus, for each radio combination different schedules would need to be created depending on how the system arrived to that radio combination.

To illustrate by way of example, if three radios R1, R2 and R3 are supported by an SDR system, the schedule for job combination {R1, R2} will be different depending on whether the system arrived at that combination from job combination {R1}, or from job combination {R2}, or from job combination {R1, R2, R3}. If the {R1, R2} combination occurs after {R1}, then it is desirable that {R1, R2} is scheduled in such a way that R1 is not interrupted. Similarly, if {R1, R2} occurs after {R2}, then {R1, R2} should be scheduled in such a way that R2 is not interrupted. Thus, a schedule for a job combination is dependent on possible previous schedules which in turn are dependent on the schedules before them, and so on. Therefore, a schedule is not only dependent on the job combination but also on the path of how the system arrived at the present combination.

In other words, to create schedules for all possible situations in advance (at compile time), schedules for all possible paths leading to each of the $2^n$ possible job combinations would have to be created. Note that each path may contain an indefinite number of any of these $2^n$ possible job combinations until it leads to the desired one. The number of all possible situations that need be prescheduled is, therefore, equal to the number of all possible ordered vectors of indefinite lengths with components ranging from 1 to $2^n$. Since this number is very large for reasonable values of n, creating schedules for all possible situations at compile time is infeasible.

According to an exemplary embodiment, processing apparatus 100 may determine one or more possible combinations of radios that may occur after a change in the currently running set of radios. In addition, processing apparatus 100 may create schedules for one or more possible combinations of radios that may occur after a change in the currently running set of radios. The schedules may then be stored in memory 120. Processing apparatus 100 may include a dedicated processor for determining one or more possible combinations of radios and creating schedules for the one or more possible combinations. Alternately, there may be provided a dedicated processor and memory for creating and storing schedules, respectively.

Figure 2:
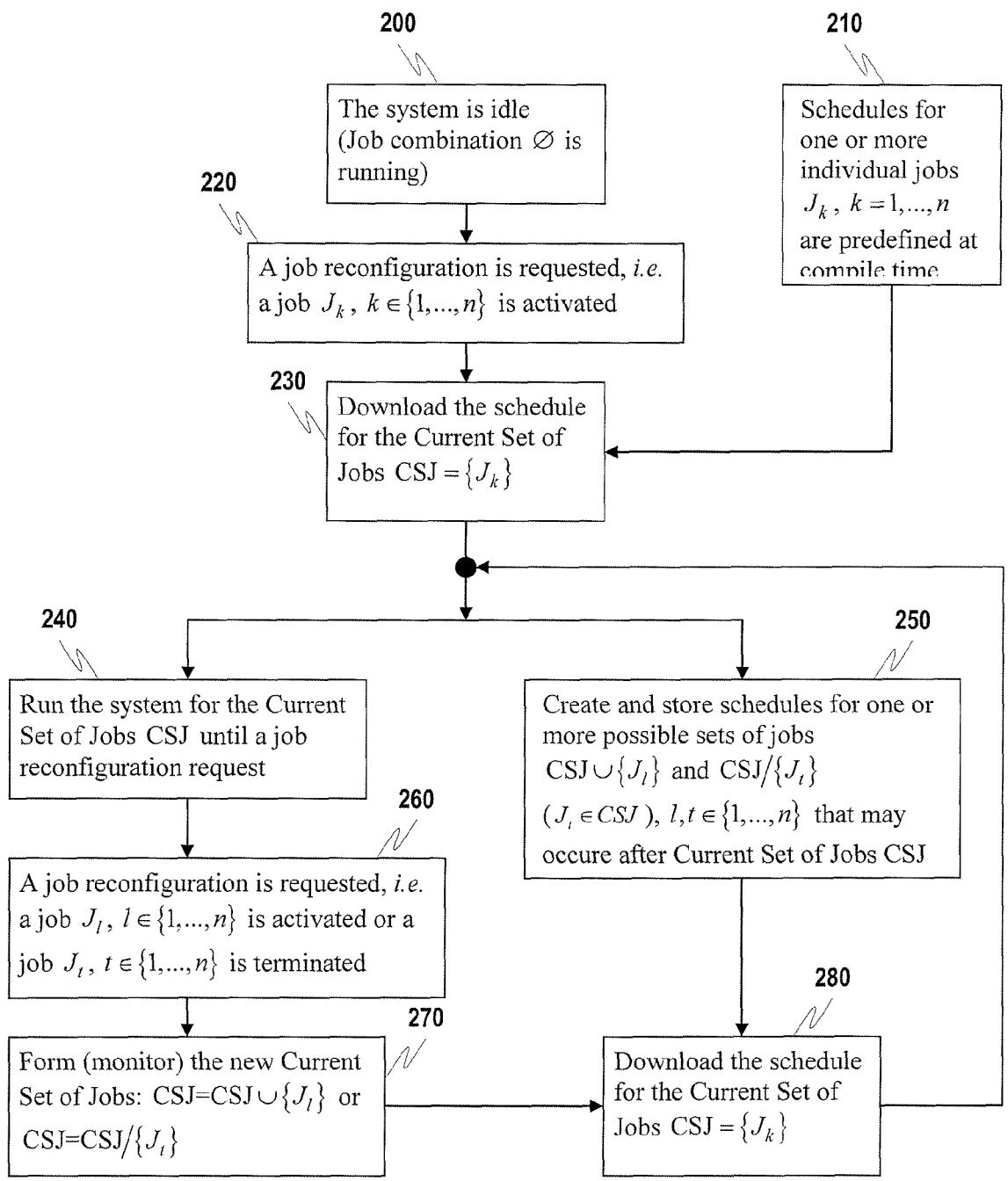
FIG. 2 discloses an exemplary flowchart for a process of scheduling jobs in accordance with at least one embodiment of the present invention.

FIG. 2 discloses an exemplary process flowchart, in accordance with at least one embodiment of the present invention, for scheduling different combinations of several periodic jobs simultaneously running on shared processing apparatus 100 which may comprise several processors and/or hardware accelerators. The jobs may correspond to radios in a SDR system.

According to an exemplary embodiment, a piece-wise stationary system may support a set of jobs $J_1, \ldots, J_n$. Each job $J_k$, k=1, \ldots, n may be a stationary job which may be requested to start or to terminate at an arbitrary time. The system may be in an idle state when the current set of jobs is $\emptyset$ as shown in step 200. In step 210, schedules for one or more individual jobs $J_k$, k=1, \ldots, n may be created and stored in memory 120. Alternately, created schedules may be stored in memory dedicated for storing schedules. In accordance with an exemplary embodiment, any scheduling algorithm may be used to create the schedules. When a job reconfiguration is requested, e.g. to start a job $J_k$ as shown in step 220, the schedule corresponding to $J_k$, which was created in step 210, may be retrieved from memory 120 or the dedicated memory as shown in step 230. Subsequently, the current set of jobs (CSJ), which now includes job $J_k$, may be executed by the processing apparatus 100 in step 240 until a job reconfiguration request is received. While the CSJ is being executed in step 240, processing apparatus 100, in step 250, simultaneously creates and stores in memory 120 schedules for one or more possible sets of jobs that may occur after the CSJ is changed. Alternately, a dedicated processor may be employed to create schedules.

In accordance with an exemplary embodiment, every time the CSJ is dynamically modified and while the modified CSJ is being executed by the processing apparatus 100, processing apparatus 100 simultaneously creates and stores in memory 120 schedules for one or more possible sets of jobs that may occur after the modified CSJ is changed. In other words, schedules for $CSJ \cup \{J_l\}$, $J_l \in \{J_1, \ldots, J_n\}$ and $CSJ/\{J_t\}$ ($J_t \in CSJ$), $l, t \in \{1, \ldots, n\}$ that may occur after the CSJ may be created by processing apparatus 100. The schedules may then be optimized using a conventional optimization technique. It is noted that the maximum number of schedules that need to be created and stored is 2n, which is significantly less than the number of schedules that would need to be created if schedules for all possible job combinations were created at compile time.

In step 260, a job reconfiguration is requested in which a job $J_l$ may be activated or a job $J_t$ may be terminated. Step 270 may modify the CSJ to include $J_l$ or to remove $J_t$. Step 280 may retrieve the schedule, which was created in step 250, corresponding to the modified CSJ from memory 120. The CSJ may then be executed according to the retrieved schedule by processing apparatus 100. In an unlikely case that the request to modify the CSJ is received earlier than all the schedules are created, processing apparatus 100 may terminate creation of all possible schedules for $CSJ \cup \{J_l\}$, $J_l \in \{J_1, \ldots, J_n\}$ and $CSJ/\{J_t\}$ ($J_t \in CSJ$), $l, t \in \{1, \ldots, n\}$ and may only create or download the schedule for the requested new CSJ. In accordance with an exemplary embodiment, this results in a low scheduling overhead because the schedules need not be created at run-time. This may relax the real-time constraints of creating schedules, and as a result more sophisticated scheduling policies and optimization techniques may be utilized.

It is important to note that the scope of the previously described exemplary process in accordance with at least one embodiment of the present invention need not be limited to jobs and may also be utilized for scheduling tasks. Additionally, in accordance with at least one embodiment, the process may be utilized for scheduling radios in a SDR system.

In accordance with an exemplary embodiment, a change in the CSJ may be caused by a change of the scheduling of a single radio or job. For example, radio $J_r$ may work in a slotted radio system in which it uses every $3^{rd}$ slot. When the slotted radio system wants to increase the data rate with radio $J_r$, it may change the slot allocation from every $3^{rd}$ slot to every $2^{nd}$ slot. Such a change in the scheduling of radio $J_r$ may also be pre-determined by processing apparatus 100 and used in the creation of schedules for one or more possible sets of radios that may occur after a change in the currently running set of radios or jobs. The created schedules may be stored in memory 120 as previously described.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

What is claimed:

1. A method, comprising:
   receiving a request to execute a current set of jobs, the current set of jobs including two or more jobs to be executed by at least one processor, wherein the jobs correspond to software defined radios;
   retrieving a predetermined schedule corresponding to the current set of jobs;
   executing the current set of jobs according to the predetermined schedule, including the two or more jobs;
   determining, during execution of the current set of jobs, all possible combinations of sets of jobs that may result after a given change in the current set of jobs, so that the two or more jobs are not interrupted;
   creating a plurality of schedules and each of the plurality of schedules is for each of said all possible combinations of sets of jobs that may result after the given change in the current set of jobs, wherein each said plurality of schedules is created dependent upon a job set arrival path to the given change in the current set of jobs that includes the two or more jobs;
   storing each said plurality of schedules created for each of said all possible combination sets of jobs;
   retrieving a schedule from each of said plurality of schedules after the given change in the current set of jobs based on the job set arrival path; and
   executing the current set of jobs after the given change, according to the retrieved schedule, wherein the given change in the current set of jobs is adding or removing one job at a time from the current set of jobs.

2. The method according to claim 1, wherein the determination is performed by a dedicated processor.

3. The method according to claim 1, wherein the schedule creation is performed by a dedicated processor.

4. An apparatus, comprising:
   at least one radio component; and
   at least one processor;
   the at least one processor configured to cause the apparatus at least to perform:
   receive a request to execute a current set of radios, the current set of radios including two or more radios to be executed by the at least one processor, wherein the radios correspond to software defined radios;
   retrieve a predetermined schedule corresponding to the current set of radios;
   execute the current set of radios according to the predetermined schedule, including the two or more radios;
   determine, during execution of the current set of radios, all possible combinations of sets of radios that may result after a given change in the current set of radios, so that the two or more radios are not interrupted;
   create a plurality of schedules and each of the plurality of schedules is for each of said all possible combinations of sets of radios that may result after the given change in the current set of radios, wherein each said plurality of schedules is created dependent upon a radio set arrival path to the given change in the current set of radios that includes the two or more radios;
   store each said plurality of schedules created for each of said all possible combination sets of radios;
   retrieve a schedule from each of said plurality of schedules after the given change in the current set of radios based on the radio, set arrival path; and
   execute the current set of radios after the given change, according to the retrieved schedule, wherein the given change in the current set of radios is adding or removing one radio, at a time from the current set of radios.

5. The apparatus according to claim 4, further comprising:
   a dedicated processor configured to perform the determination.

6. The apparatus according to claim 4, further comprising:
   a dedicated processor configured to perform the schedule creation.

7. A computer program product comprising computer executable program code recorded on a non-transitory computer readable storage medium, the computer executable program code comprising:
    code for causing receipt of a request to execute a current set of jobs, the current set of jobs including two or more jobs to be executed by at least one processor, wherein the jobs correspond to software defined radios;
    code for causing retrieval of a predetermined schedule corresponding to the current set of jobs;
    code for causing execution of the current set of jobs according to the predetermined schedule, including the two or more jobs;
    code for causing determination of, during execution of the current set of jobs, all possible combinations of sets of jobs that may result after a given change in the current set of jobs, so that the two or more jobs are not interrupted;
    code for causing creation of a plurality of schedules and each of the plurality of schedules is for each of said all possible combinations of sets of jobs that may result after the given change in the current set of jobs, wherein each said plurality of schedules is created dependent upon a job set arrival path to the given change in the current set of jobs that includes the two or more jobs;
    code for storing each said plurality of schedules created for each of said all possible combination sets of jobs;
    code for retrieving a schedule from each of said plurality of schedules after the given change in the current set of jobs based on the job set arrival path; and
    code for executing the current set of jobs after the given change, according to the retrieved schedule, wherein the given change in the current set of jobs is adding or removing one job at a time from the current set of jobs.

8. A chipset comprising:
    at least one processor;
    at least one controller module, the controller module configured to cause the chipset at least to perform:
        receive a request to execute a current set of jobs, the current set of jobs including two or more jobs to be executed by at least one processor, wherein the jobs correspond to software defined radios;
        retrieve a predetermined schedule corresponding to the current set of jobs;
        execute the current set of jobs according to the predetermined schedule, including the two or more jobs;
        determine, during execution of the current set of jobs, all possible combinations of sets of jobs that may result after a given change in the current set of jobs, so that the two or more jobs are not interrupted;
        create a plurality of schedules and each of the plurality of schedules is for each of said all possible combinations of sets of jobs that may result after the given change in the current set of jobs, wherein each said plurality of schedules is created dependent upon a job set arrival path to the given change in the current set of jobs that includes the two or more jobs;
        store each said plurality of schedules created for each of said all possible combination sets of jobs;
        retrieve a schedule from each of said plurality of schedules after the given change in the current set of jobs based on the job set arrival path; and
        execute the current set of jobs after the given change, according to the retrieved schedule, wherein the given change in the current set of jobs is adding or removing one job at a time from the current set of jobs.

9. The chipset according to claim 8, wherein the controller module comprises:
    a dedicated processor configured to perform the determination.

10. The chipset according to claim 8, wherein the controller module comprises:
    a dedicated processor configured to perform the schedule creation.

* * * * *